(12) United States Patent
Ueda et al.

(10) Patent No.: US 7,722,108 B2
(45) Date of Patent: May 25, 2010

(54) WINDSHIELD DEVICE

(75) Inventors: Yukiya Ueda, Saitama (JP); Yukinori Kurakawa, Saitama (JP); Yohei Kawasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 11/905,103

(22) Filed: Sep. 27, 2007

(65) Prior Publication Data

US 2008/0079285 A1    Apr. 3, 2008

(30) Foreign Application Priority Data

Sep. 29, 2006    (JP) .............................. 2006-267117

(51) Int. Cl.
*B62J 17/04*    (2006.01)
(52) U.S. Cl. ..................... 296/78.1; 454/122
(58) Field of Classification Search .............. 296/77.1, 296/78.1, 91; 454/122, 141, 142, 143, 150
See application file for complete search history.

(56) References Cited

U.S. PATENT DOCUMENTS

| | | | | | |
|---|---|---|---|---|---|
| 1,020,336 | A | * | 3/1912 | White | 296/91 |
| 2,022,833 | A | * | 12/1935 | Welch | 296/91 |
| 2,087,651 | A | * | 7/1937 | Mygland | 454/138 |
| 2,987,980 | A | * | 6/1961 | Winn | 454/138 |
| 3,647,256 | A | * | 3/1972 | Cox | 296/91 |
| 4,830,135 | A | * | 5/1989 | Yamashita | 180/229 |
| 4,906,086 | A | * | 3/1990 | Imai et al. | 359/844 |
| 4,911,494 | A | * | 3/1990 | Imai et al. | 296/78.1 |
| 4,964,484 | A | * | 10/1990 | Buell | 180/219 |
| 5,409,287 | A | * | 4/1995 | Suzuki | 296/180.1 |
| 5,591,078 | A | * | 1/1997 | Filion et al. | 454/124 |
| 5,630,640 | A | * | 5/1997 | Fior | 296/91 |
| 7,261,358 | B2 | * | 8/2007 | Kurakawa et al. | 296/78.1 |
| 7,267,386 | B2 | * | 9/2007 | Hesch | 296/39.3 |
| 2008/0185865 | A1 | * | 8/2008 | Matsuo et al. | 296/78.1 |
| 2009/0108620 | A1 | * | 4/2009 | Matsuo et al. | 296/91 |
| 2009/0108621 | A1 | * | 4/2009 | Matsuo et al. | 296/91 |

FOREIGN PATENT DOCUMENTS

| | | |
|---|---|---|
| AU | 8412282 A | 1/1983 |
| DE | 10240823 A1 | 3/2004 |
| EP | 1621454 A2 | 2/2006 |
| JP | 64-1671 A | 1/1989 |
| JP | 10-203454 A | 8/1998 |
| JP | 2002-284073 A | 10/2002 |

* cited by examiner

*Primary Examiner*—Patricia L Engle
(74) *Attorney, Agent, or Firm*—Birch, Stewart, Kolasch & Birch LLP

(57) ABSTRACT

A windshield device for obtaining a favorable screen effect with respect to an air flow from the sides of a screen while suppressing large-sizing of the screen in the vehicle width direction. In a front cowling which includes a screen unit which is mounted on a front portion of a vehicle body and has a screen, an air introducing opening is formed in a front portion of the screen unit and opens forwardly. An air blow-off opening is formed in an upper portion of the screen unit that opens upwardly. An air duct allows the screen unit and the air blow-off opening to communicate with each other. Air discharge ports which open outwardly and to the sides from the vehicle are formed in a side of the air duct.

24 Claims, 8 Drawing Sheets

WINDSHIELD DEVICE

CROSS-REFERENCE TO RELATED APPLICATIONS

The present application claims priority under 35 USC 119 to Japanese Patent Application No. 2006-267117 filed on Sep. 29, 2006 the entire contents of which are hereby incorporated by reference.

BACKGROUND OF THE INVENTION

1. Field of the Invention

The present invention relates to a windshield device applicable to a motorcycle or the like.

2. Description of Background Art

Conventionally, a windshield device for a vehicle is known which forms an air blow-off opening which opens upwardly in an upper portion of a screen of a windshield device body. In this windshield device, a portion of air flow which is taken into the windshield device through an air introducing opening formed in a front portion of the windshield device body is blown off upwardly from the air blow-off opening thus guiding the whole air flow such that the air flow avoids an occupant behind the screen with such an air flow whereby a screen effect can be enhanced while suppressing a height of the screen. See, for example, JP-A-64-1617.

However, although the above-mentioned windshield device takes a size of the screen in the vertical direction into consideration, the windshield device does not take an air flow from the sides of the windshield device into consideration. Thus, there exists a drawback that it is necessary to increase a size of the screen in the vehicle widthwise direction to enhance a screen effect of the air flow from the sides.

SUMMARY AND OBJECTS OF THE INVENTION

Accordingly, it is an object of the present invention to provide a windshield device which can obtain a favorable screen effect also with respect to an air flow from the sides of a screen while suppressing large-sizing of the screen in the vehicle width direction.

To overcome the above-mentioned drawbacks, an embodiment of the present invention is directed to a windshield device (for example, a front cowling 16 in an embodiment) including a windshield device body (for example, a screen unit 25 in the embodiment) which is mounted on a front portion of a vehicle body and includes a screen (for example, a screen 26 in the embodiment) with an air introducing opening (for example, an air introducing opening 37 in the embodiment) which is formed in a front portion of the windshield device body and opens forwardly. An air blow-off opening (for example, an air blow-off opening 36 in the embodiment) is formed in an upper portion of the windshield device body and opens upwardly. An air duct (for example, an air duct 27 in the embodiment) allows the air introducing opening and the air blow-off opening to communicate with each other. An air discharge port (for example, air discharge ports 41*a*, 41*b*, 41*c* in the embodiment) opens outwardly and to the side from the vehicle, the air discharge port is formed in a side of the air duct.

Due to such a constitution, by blowing off a portion of the air flow (outside air blown from a front side of the vehicle) which is taken into the windshield device from the air introducing opening formed in a front portion of the windshield device body toward the sides of the vehicle from the air discharge port, it is possible to guide the air flow to the outside such that the air flow avoids a rider behind the windshield device body with such an air flow. Thus, it is unnecessary to increase a size of the windshield device body in the vehicle width direction whereby it is possible to enhance a screen effect with respect to the air flow which flows on both sides of the rider while suppressing large-sizing of the windshield device body.

According to an embodiment of the present invention, a duct (for example, ducts 40*a*, 40*b*, 40*c* in the embodiment) which includes the air discharge port is mounted on the side of the air duct.

Due to such a constitution, the air flow which flows in the inside of the air duct can be efficiently guided to the air discharge port by imparting directivity to the air flow. Thus, it is possible to effectively direct the air flow such that the air flow flows toward the sides of the vehicle.

According to an embodiment of the present invention, the air discharge port opens upwardly and obliquely.

Due to such a constitution, it is possible to guide the air flow to the outside such that the air flow avoids, in particular, the area surrounding the ears and shoulders of the rider.

According to an embodiment of the present invention, the air duct has a size thereof narrowed in the longitudinal direction of the vehicle body and a size thereof widened in the lateral direction of the vehicle body along the extending of the air duct from the air introducing opening toward the air blow-off opening.

Due to such a construction, by suppressing the size of an upper portion of the windshield device body in the longitudinal direction of the vehicle body, that is, a thickness size of the windshield device body and, at the same time, by expanding a size of the upper portion of the windshield device body in the lateral direction of the vehicle body, that is, a width size of the windshield device body, it is possible to blow off the air flow over a wide range. Further, the width size of the windshield device body is expanded. Thus, the introduction of the air flow which flows in the inside of the air duct toward the air discharge port arranged on the sides of the duct can be facilitated.

According to an embodiment of the present invention, a plurality of the air discharge ports are arranged along the vertical direction of the air duct.

Due to such a construction, it is possible to obtain the screen effect over a wide range in the vertical direction on the sides of the windshield device body.

According to an embodiment of the present invention, the duct is formed in an elliptical shape.

Due to such a construction, it is possible to decrease an energy loss of the air flow at the air discharge port at the time of blowing off the air flow.

According to an embodiment of the present invention, it is unnecessary to increase the windshield device body in the vehicle width direction. Thus, it is possible to realize a miniaturization and a reduction in weight of the vehicle body by suppressing the large-sizing of the windshield device body and, at the same time, it is possible to enhance the screen effect with respect to the air flow which flows on the sides of the vehicle body.

According to an embodiment of the present invention, by imparting the directivity to the air flow which flows in the inside of the air duct, it is possible to efficiently guide the air flow to the air discharge port and to efficiently direct the air flow toward the sides of the vehicle body. Thus, it is possible to obtain an advantageous effect wherein the air flow blown off from the sides of the air duct can be easily blown off to the side.

According to an embodiment of the present invention, it is possible to obtain an advantageous effect wherein noises around the ears of a rider can be attenuated while suppressing a height of the windshield device body and, at the same time, it is also possible to obtain an advantageous effect wherein the air flow which impinges on the area surrounding the shoulders of a rider can be guided to the outside. Thus, wind pressure can be alleviated.

According to an embodiment of the present invention, it is possible to provide an appearance of a light-weight feeling to an upper portion of the windshield device body and, at the same time, it is possible to further enhance the screen effect by expanding a range in which the screen effect attributed to the air flow can be obtained. Still further, according to an embodiment of the present invention, the blow-off of the air flow which flows in the inside of the air duct sideward is facilitated.

According to an embodiment of the present invention, it is possible to further enhance the screen effect by expanding a range in which a screen effect on the sides of the windshield device body is obtained.

According to an embodiment of the present invention, it is possible to efficiently blow off the air flow which is taken into the windshield device through the air introducing opening.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 12(a) and 12(b) are views showing another modification of the above-mentioned front cowling, wherein FIG. 12(a) is a perspective view of the front cowling, and FIG. 12(b) is a cross-sectional view taken along a line F-F in FIG. 12(a).

DETAILED DESCRIPTION OF THE PREFERRED EMBODIMENTS

Figure 1:
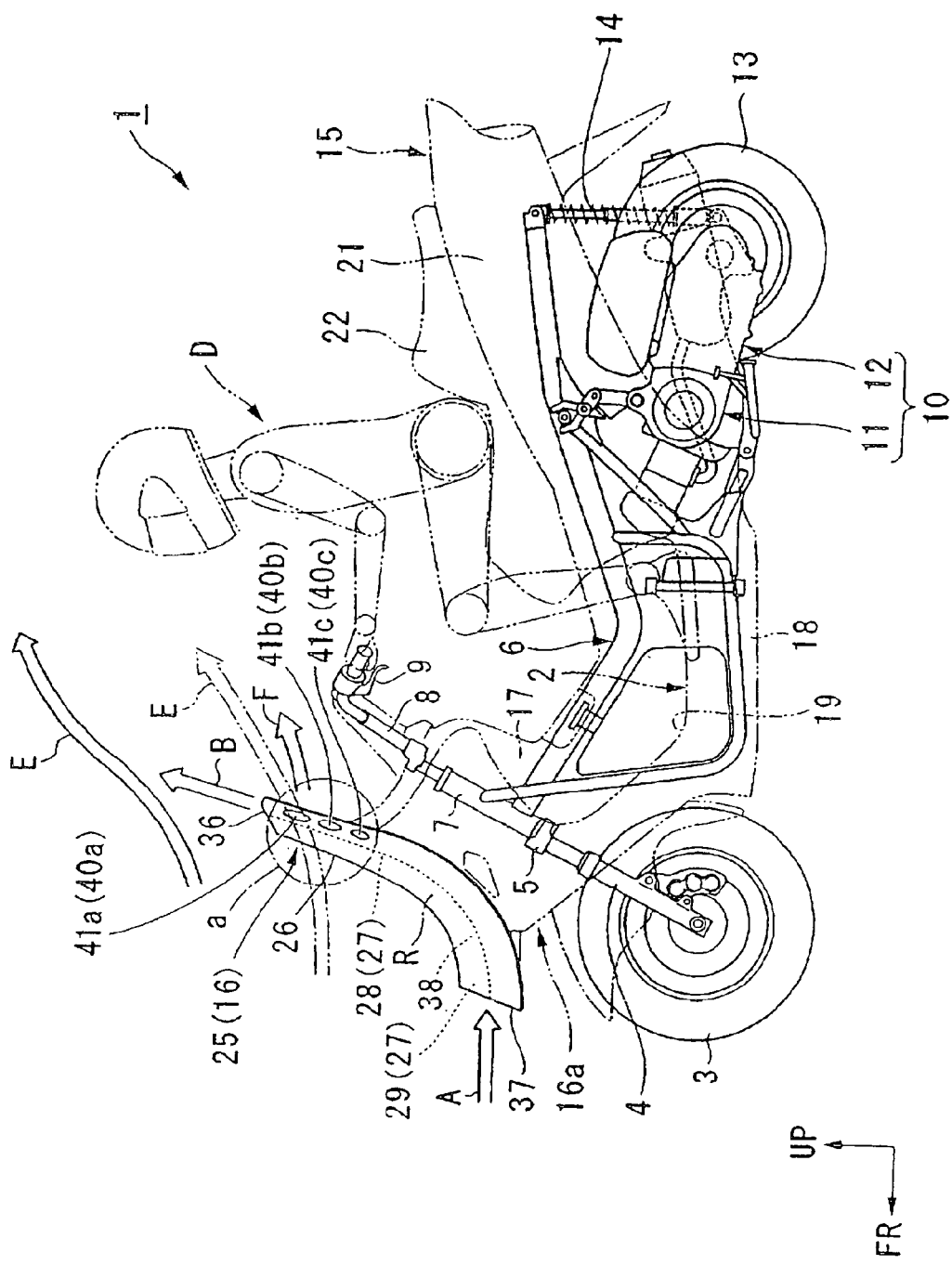
FIG. 1 is a side view of a motorcycle according to an embodiment of the present invention.

Hereinafter, embodiments of the present invention are explained in conjunction with drawings. The directions such as the longitudinal direction, the lateral direction and the like in the explanation made hereinafter are equal to the corresponding directions in a vehicle unless otherwise described. Further, in the drawings, an arrow FR, LH and UP indicate the forward direction of the vehicle, the left sideward direction of the vehicle and the upward direction of the vehicle, respectively.

A motorcycle 1 shown in FIG. 1 is a scooter-type vehicle which includes a low floor 2. A front wheel 3 is pivotally supported on a front fork 4, and the front fork 4 is steerably pivotally supported on a head pipe 7 mounted on a front end portion of a vehicle body frame 6 by way of a handlebar stem 5. A handlebar 8 is mounted on an upper end portion of the handlebar stem 5, and on each one of left and right grip portions of the handlebar 8, a brake lever 9 which is a manipulator for manipulating a rear brake and a front brake is respectively mounted.

On a rear portion of the vehicle body frame 6, a swing unit 10 is swingably and pivotally mounted about a front end side thereof. The swing unit 10 is integrally constituted of an engine 11 which is mounted on a front portion thereof and a power transmission mechanism 12 which is mounted on a rear portion thereof, and a rear wheel 13 is connected to an output shaft on a rear end side of the power transmission mechanism 12. A pair of left and right rear cushions 14 is arranged between a rear end portion of the swing unit 10 and a rear end portion of the vehicle body frame 6.

The vehicle body frame 6 is covered with a body cover 15 mainly made of a synthetic resin. The body cover 15 includes a front cowling (windshield device) 16 for covering a front portion of the vehicle body frame 6 in a state wherein a covering range extends from a front side to both lateral sides of the vehicle body frame 6, a leg shield 17 for covering the front portion of the vehicle body frame 6 from behind the front portion, an under cover 18 for covering a lower portion of the vehicle body frame 6 in a state wherein the under cover 18 is continuously connected to a lower end portion of the front cowling 16, a foot board 19 for covering the lower portion of the vehicle body frame 6 from above, and a pair of left and right side covers 21 for covering a rear portion of the vehicle body frame 6.

Above the rear portion of the vehicle body frame 6, a seat 22 for occupants (rider and pillion) is arranged, wherein the seat 22 is operable to open or close an article storing chamber (not shown in drawings) arranged in the inside of both side covers 21.

An occupant (rider D) who sits on a front portion of the seat 22 of the motorcycle 1 assumes the driving posture in which the rider grips the handle 8 with his/her both hands and places his/her feet on a footboard 19. Here, a portion of the front cowling 16 which faces the rider D is formed as a screen unit 25 (windshield device body) which mainly protects the rider D from air flow pressure.

Figure 2:
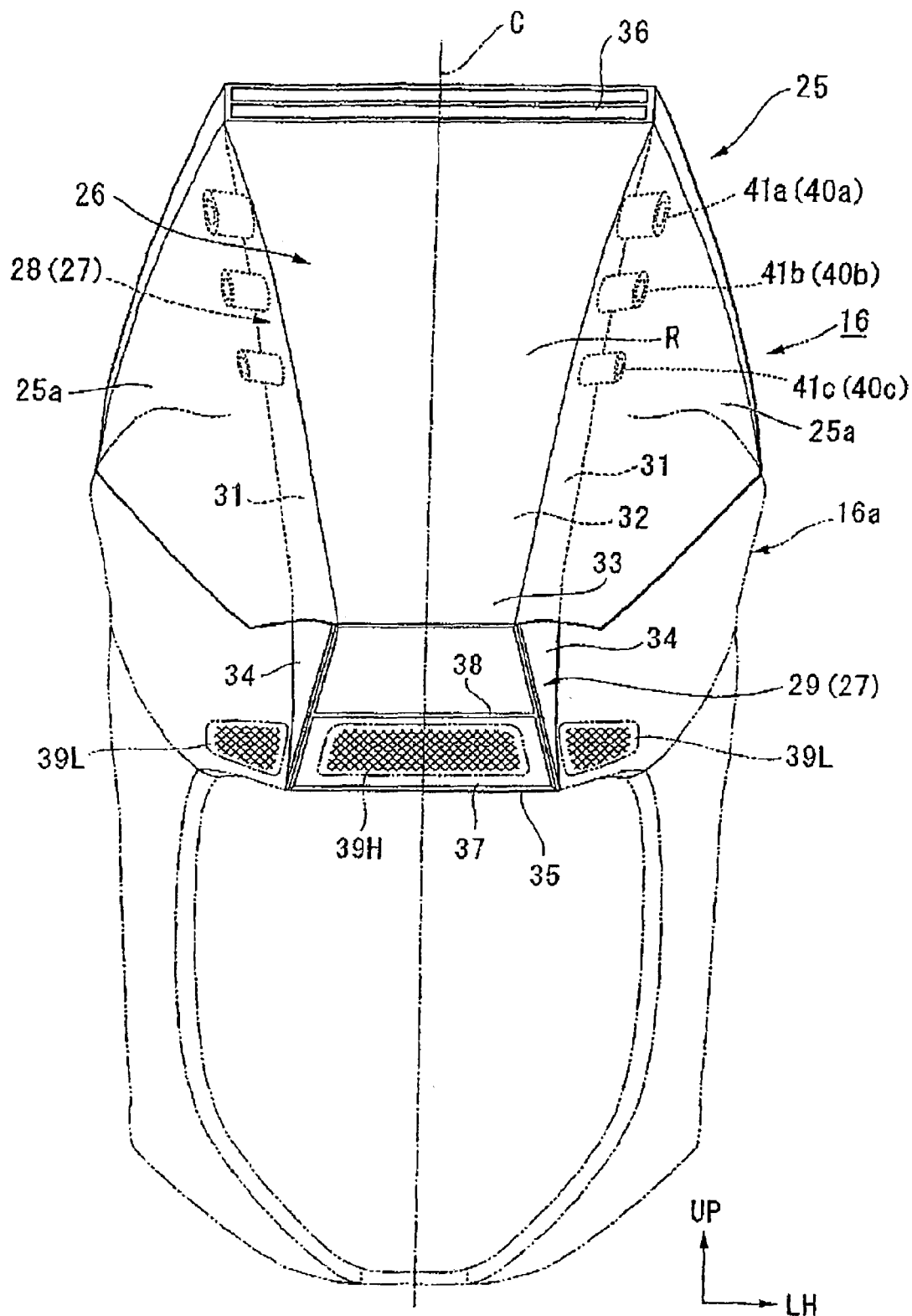
FIG. 2 is a front view of a front cowling of the above-mentioned motorcycle.
Figure 3:
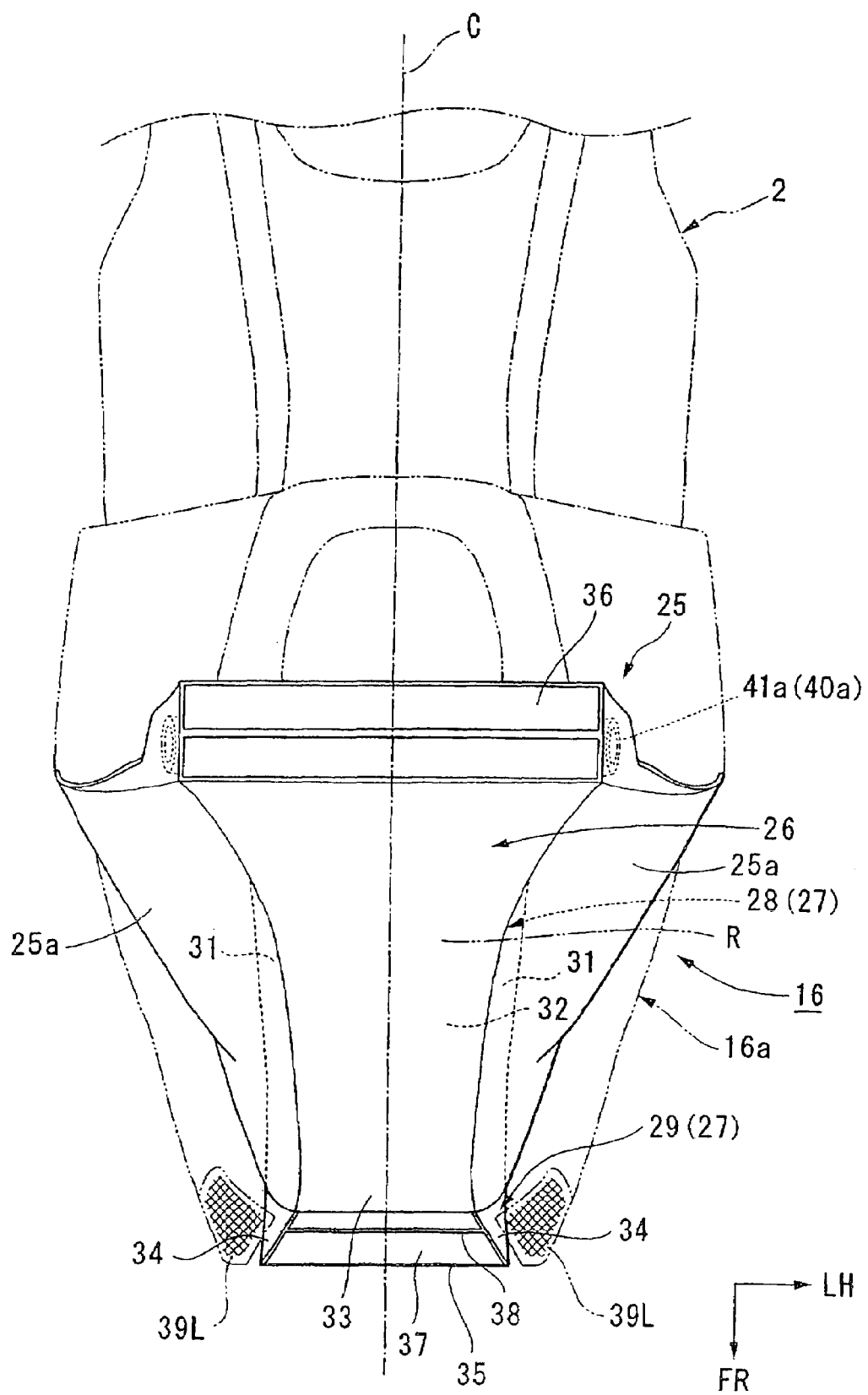
FIG. 3 is an upper plan view of the above-mentioned front cowling.

To explain the embodiment also in conjunction with FIGS. 2 and 3, the screen unit 25 includes a plate-like screen 26 for forming a front surface of an upper portion of the front cowling 16 and an air duct 27 which is integrally formed with the screen 26 by molding on a back surface side (rear surface side) of the screen 26. The screen unit 25 is arranged in left-and-right symmetry with respect to a center surface C in the vehicle-width direction of the motorcycle 1.

The screen 26 is arranged such that the screen 26 is raised obliquely in the rearward and upward direction from an upper end portion of a cowling body 16a of the front cowling 16 and both side portions 25a, 25a of the screen 26 are curved rearwardly. Due to such a construction, the screen 26 receives the outside air A (air flow) oncoming from the front of the vehicle and allows the outside air A to flow obliquely in the rearward and upward direction and to the sides (see an arrow shown in FIG. 1). An upper end portion of such a screen 26 is formed substantially parallel to the vehicle width direction and, at the same time, a height of the screen 26 is suppressed to an extent that the screen 26 does not obstruct a front viewing field of a rider D.

The air duct 27 includes a duct body 28 which extends along the screen 26 and an introducing portion 29 which is contiguously formed with a lower end portion of the duct body 28. Here, the duct body 28 includes a vehicle-width-directional center portion of the screen 26, a pair of side wall portions 31 which is mounted on a back surface side of the screen 26 in an erected manner, and a rear wall portion 32 which extends between rear end portions of the side wall portions 31.

On the other hand, the introducing portion 29 includes a screen extension portion 33 which extends continuously and frontwardly from a lower end portion of the vehicle-width-directional center portion of the screen 26 in a curved shape, side wall extension portions 34 which extend from respective side wall portions 31 in the same manner as the screen extension portion 33, and a rear wall extension portion 35 which extends from the rear wall portion 32.

Such an air duct 27 defines an air flow passage R which continuously and smoothly extends from the duct body 28 to the introducing portion 29.

Further, in an upper end portion of the screen unit 25, an air blow-off opening 36 is formed as an upper opening of the air duct 27 which is surrounded by an upper end portion of the vehicle-width-directional center portion of the screen 26 and upper end portions of both side wall portions 31 and a rear wall portion 32. On the other hand, in a front end portion of the introducing portion 29, an air introducing opening 37 is formed as a front opening portion of the air duct 27 which is surrounded by the screen extension portion 33, both side wall extension portions 34 and the rear wall extension portion 35.

The air introducing opening 37 is configured to open in the forward direction of the vehicle at the approximately vehicle-width-directional center portion of the front cowling 16 so as to allow the introduction of the outside air A (air flow) which is blown from the front of the vehicle into the air duct 27 (see an arrow in FIG. 1). When the outside air A is introduced into such an air introducing opening 37 under predetermined pressure, the outside air A is blown off obliquely in the rearward and upward direction as an air flow B from the air blow-off opening 36 which opens upwardly (see an arrow in FIG. 1).

The air introducing opening 37 is formed in a trapezoidal shape in which a width of a lower side (rear wall extension portion 35 side) is set larger than a width of an upper side as viewed in a front view. On the other hand, the air blow-off opening 36 is formed in a rectangular shape in which the air blow-off opening 36 is larger than the air introducing opening 37 in the width direction of the screen unit 25 (corresponding to the lateral direction of the vehicle body), and is smaller than the air introducing opening 37 in the thickness direction of the screen unit 25 (corresponding to the longitudinal direction of the vehicle body).

Further, the air duct 27 which allows the air introducing opening 37 and the air blow-off opening 36 to communicate with each other extends from the air introducing opening 37 side to the air blow-off opening 36 side while gradually changing a size of the air flow passage R such that the size of the air flow passage R is decreased in the above-mentioned thickness direction and is widened in the above-mentioned width direction. Here, a cross-sectional area of the air duct 27 (air flow passage R) is substantially set to a fixed value from the air introducing opening 37 to the air blow-off opening 36. In other words, an opening area of the air introducing opening 37 is substantially equal to an opening area of the air blow-off opening 36.

In the inside of the air duct 27, a partition wall 38 is provided. The partition wall 38 extends between the air introducing opening 37 and the air blow-off opening 36 and defines an upper-side passage and a lower-side passage which have substantially the same cross-sectional area along the air flow passage R. Such a partition wall 38 is considered to have a straightening effect with respect to the air flow which flows in the inside of the air duct 27 and, at the same time, the partition wall 38 has an effect to increase the rigidity of the screen unit 25.

In the screen unit 25, both the screen 26 and the air duct 27 are made of a transparent-and-colorless resin such as polycarbonate, and black-color printing (painting or the like), for example is applied to portions of the screen unit 25 which constitute both sides of the air duct 27. That is, a portion which constitutes the air duct 27 of the screen unit 25 is formed of a transparent body thus allowing the rider D to view the front of the vehicle through the screen unit 25.

Further, a lighting device may be arranged behind the rear wall portion 32 which faces the air introducing opening 37 in an opposed manner in the longitudinal direction. In this embodiment, for example, a high-beam-side headlamp 39H is arranged (see FIG. 2). More specifically, a radiated light of the high-beam-side headlamp 39H passes through the rear wall portion 32 of the air duct 27 and is radiated to the front portion of the vehicle from the air introducing opening 37. On both sides of the air introducing opening 37 of the front cowling 16, for example, low-beam-side headlamps 39L are arranged.

In this manner, by arranging the high-beam-side headlamp 39H in the inside of the air introducing opening 37, the air introducing opening 37 can be also arranged at a center portion of the vehicle body while ensuring the arrangement of the headlamp 39H at the center portion of the vehicle body.

Figure 4:
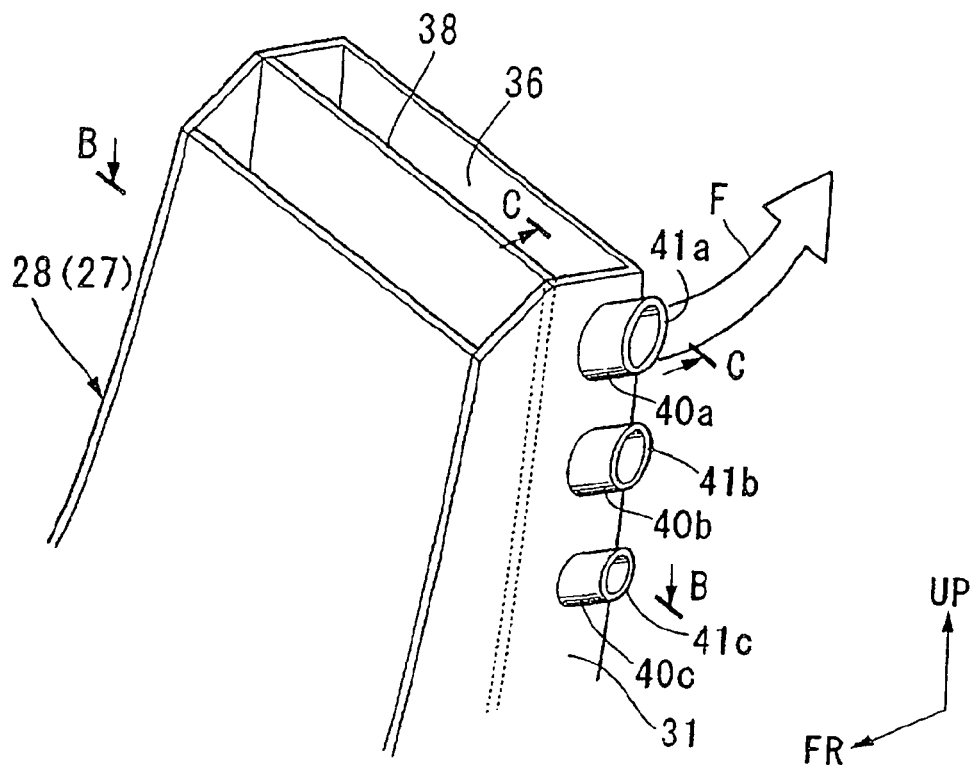
FIG. 4 is a perspective view of a portion a shown in FIG. 1 according to a first embodiment of the present invention.
Figure 5:
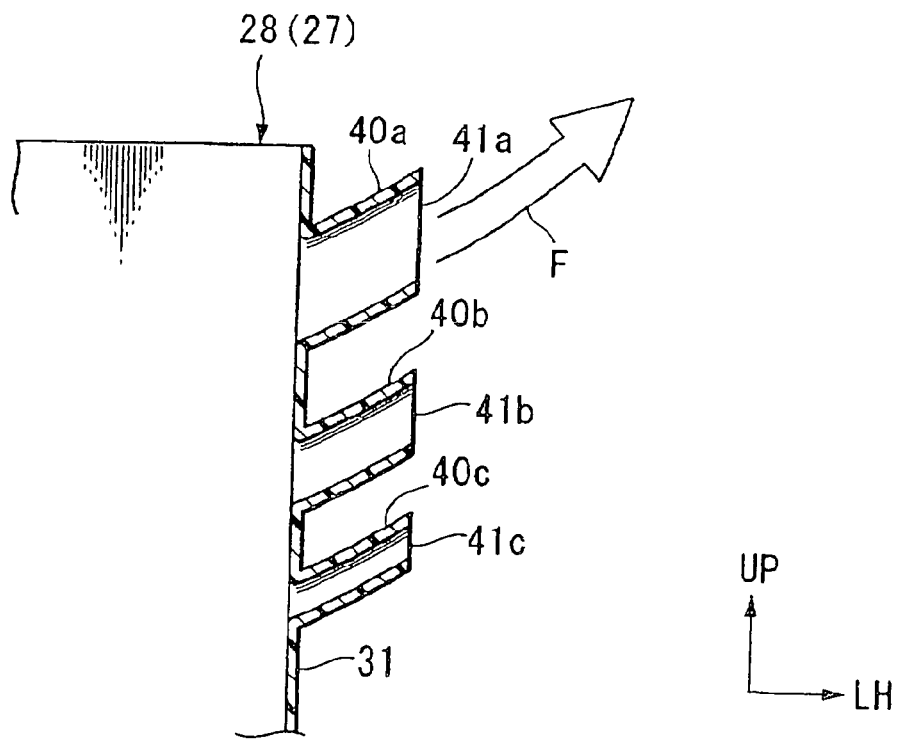
FIG. 5 is a cross-sectional view taken along a line C-C in FIG. 4 according to the first embodiment of the present invention.
Figure 6:
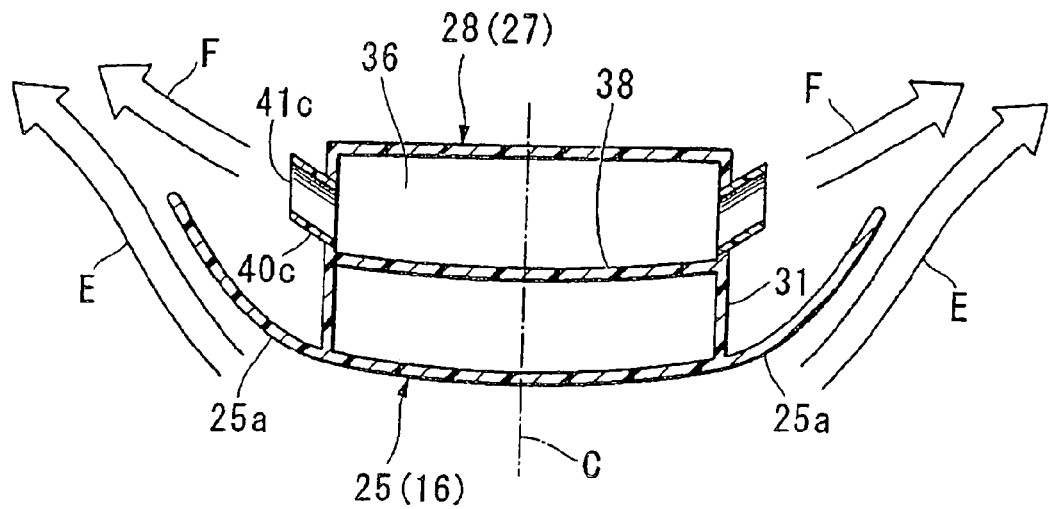
FIG. 6 is a cross-sectional view taken along a line B-B in FIG. 4 according to the first embodiment of the present invention.

As shown also in FIG. 4 to FIG. 6, on the side wall portions 31 of the lower-side passage of the air duct 27, ducts 40a, 40b, 40c having an elliptical cross-sectional shape which are in communication with the inside of the air duct 27 and are mounted in three stages downwardly from above.

These ducts 40a, 40b, 40c are straight ducts which have the same length. The ducts 40a, 40b, 40c extend toward the outside of the vehicle to the side in a state wherein the ducts 40a, 40b, 40c extend obliquely in the rearward direction along a curvature of both side portions 25a, 25a of the curved screen unit 25. The ducts 40a, 40b, 40c include openings which open upwardly. Further, cross-sectional shapes of the ducts 40a, 40b, 40c are set smaller in order from the upper stage to the lower stage.

The respective ducts 40a, 40b, 40c include air discharge ports 41a, 41b, 41c for blowing off the outside air A (see the arrow in FIG. 1) introduced from the air introducing opening 37 as an air flow F in the rear sideward direction of the vehicle. Further, the ducts 40a, 40b, 40c are configured to be covered with both side portions 25a, 25a of the screen unit 25 as viewed in a front view of the vehicle body so as to prevent the air flow E along a front surface and side surfaces of the vehicle from being drawn into the ducts 40a, 40b, 40c. FIGS. 4 and 5 show only the duct body 28 to facilitate a recognition of essential parts.

A portion of the outside air A which is introduced into the above-mentioned air introducing opening 37 under a predetermined introducing pressure flows in the inside of the air duct 27 and is blown off from the air discharge ports 41a, 41b, 41c obliquely in the rear sideward direction as the air flow F (see an arrow in FIGS. 4 to 6).

In this manner, according to the above-mentioned embodiment, an air flow B (see an arrow shown in FIG. 1) is blown off upwardly from the air blow-off opening 36 formed in the upper central portion of the screen unit 25, and by making use of such an air flow B, it is possible to guide the whole air flow E (see an arrow shown in FIG. 1) such that the air flow E avoids a rider D behind the screen unit 25. Accordingly, it is possible to enhance a screen effect with respect to the air flow E oncoming to the rider D from the front while suppressing a height of the screen.

Accordingly, the vehicle body can be miniaturized and becomes light-weight by an amount corresponding to the suppression of the screen height and, at the same time, the screen effect at the center portion of the vehicle body which corresponds to a head portion of the occupant (rider D) can be particularly enhanced thus lowering the noise around his/her ears.

Further, by arranging the air duct 27 in the inside of the screen unit 25, the air flow can be effectively introduced into the air blow-off opening 36 and, at the same time, the blown-off air flow B can be effectively directed upwardly.

More particularly, by arranging the partition wall 38 along the air flow passage R in the inside of the air duct 27, the air flow B is favorably blown off upwardly from the air blow-off opening 36 by the straightening effect of the partition wall 38 thus further enhancing the screen effect obtained by the air flow B.

Further, by arranging the air introducing opening 37 at the substantially center portion of the front cowling 16, both the air introducing opening 37 and the air blow-off opening 36 are positioned at the center portion of the front cowling 16. Thus, an airflow resistance can be reduced without making the air flow passage R between the air introducing opening 37 and the air blow-off opening 36 complicated and, at the same time, the wide air introducing opening 37 can be easily ensured thus further enhancing the screen effect obtained by the air flow B.

On the other hand, by blowing off a portion of the outside air A from the air discharge ports 41a, 41b, 41c formed in the side wall portions 31 of the air duct 27 obliquely in the rearward and upward direction as the air flow F (see an arrow shown in FIG. 1), it is possible to guide the air flow E without entangling it which flows on the sides of the vehicle along the screen unit 25 thus introducing the air flow E while avoiding the occupant (rider D).

Accordingly, it is possible to suppress the intrusion of the air flow E between the screen unit 25 and the rider D from the sides of the vehicle body. Thus, the screen effect on the sides of the front cowling 16 can be enhanced. Accordingly, it is unnecessary to increase the size of the screen unit 25 in the vehicle-width direction thus suppressing the large-sizing of the screen unit 25 whereby the miniaturization and the reduction of weight of the vehicle body can be achieved.

Further, the ducts 40a, 40b, 40c which open obliquely in the rearward and upward direction are formed in the side wall portions 31 of the air duct 27. Thus, it is possible to efficiently introduce the air flow which flows inside of the air duct 27 into the air discharge ports 41a, 41b, 41c by imparting directivity to the air flow whereby the air flow can be effectively directed to the sides as the air flow F.

Further, the air flow F blown off from the air discharge ports 41a, 41b, 41c can be blown off obliquely in the rearward and upward direction. Thus, it is possible to obtain an effect to attenuate noises around ears of the rider D while suppressing the height of the screen unit 25 and, at the same time, it is possible to obtain an effect to attenuate wind pressure by introducing the air flow E which impinges on approximately the shoulder portions of the rider D to the outside.

Still further, by narrowing the air duct 27 in the longitudinal direction of the vehicle body and widening the air duct 27 in the lateral direction of the vehicle body along with the extension of the air duct 27 from the air introducing opening 37 to the air blow-off opening 36, a size of an upper portion of the screen unit 25 in the longitudinal direction of the vehicle body, that is, a thickness size of the screen unit 25 can be suppressed thus providing an appearance with light-weight feeling. Further, by increasing the size of the upper portion of the screen unit 25 in the lateral direction of the vehicle body thus blowing off the air flow B over a wide range, a range in which the screen effect can be obtained can be expanded. Further, corresponding to the advancing of the air flow which flows in the inside of the air duct 27 toward an upper portion of the air duct 27, the air flow can be guided to the sides more efficiently. Thus, the introduction of the air flow into the ducts 40a, 40b, 40c is facilitated.

Further, the ducts 40a, 40b, 40c are formed on the side wall portions 31 of the air duct 27 in three stages downwardly from above. Thus, compared to a case in which a single duct is formed, the air flow F can be blown off in a wide range in the vertical direction by increasing an interval in the vertical direction. Accordingly, the screen effect on the side portion of the screen unit 25 can be further enhanced.

Still further, depending on a type of the vehicle and the riding position of the rider, a position of an upper half body of the rider D is changed. However, by changing the sizes of the cross-sectional shapes of the plurality of air discharge ports 41a, 41b, 41c, it is possible to adjust a flow rate of the air flow F blown off from the respective air discharge ports 41a, 41b, 41c. Accordingly, the windshield device can cope with the kind of vehicle by changing the sizes of the cross-sectional shapes of the air discharge ports 41a, 41b, 41c thus increasing the degree of freedom in designing the windshield device.

Further, the ducts 40a, 40b, 40c are formed in an elliptical shape. Thus, different from a case in which ducts are formed in a polygonal shape, an energy loss such as a friction loss generated at corner portions can be eliminated whereby an energy loss in the ducts 40a, 40b, 40c at the time of blowing off the air flow F can be reduced. Accordingly, it is possible to efficiently blow off the outside air A taken into the windshield device through the air introducing opening 37 from the air discharge ports 41a, 41b, 41c.

Figure 7:
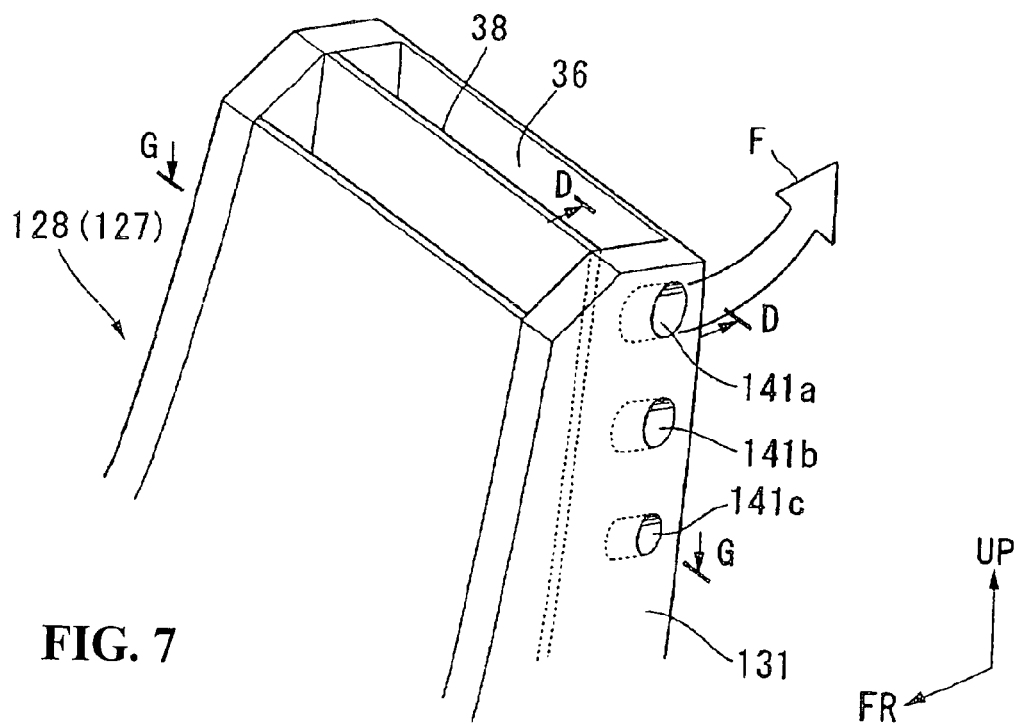
FIG. 7 is a perspective view of a portion a shown in FIG. 1 according to a second embodiment of the present invention.
Figure 8:
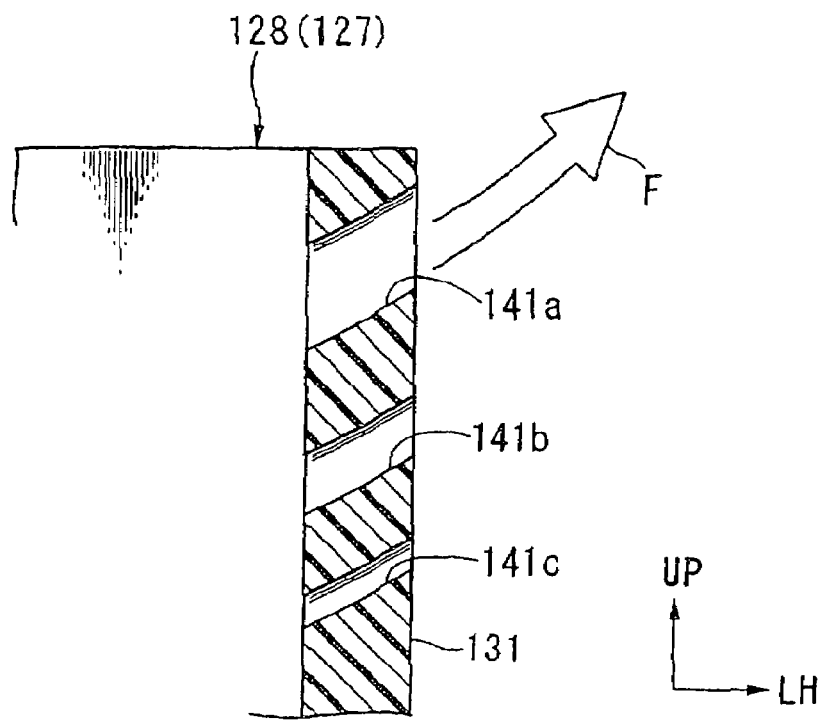
FIG. 8 is a cross-sectional view taken along a line D-D in FIG. 7 according to the second embodiment of the present invention.
Figure 9:
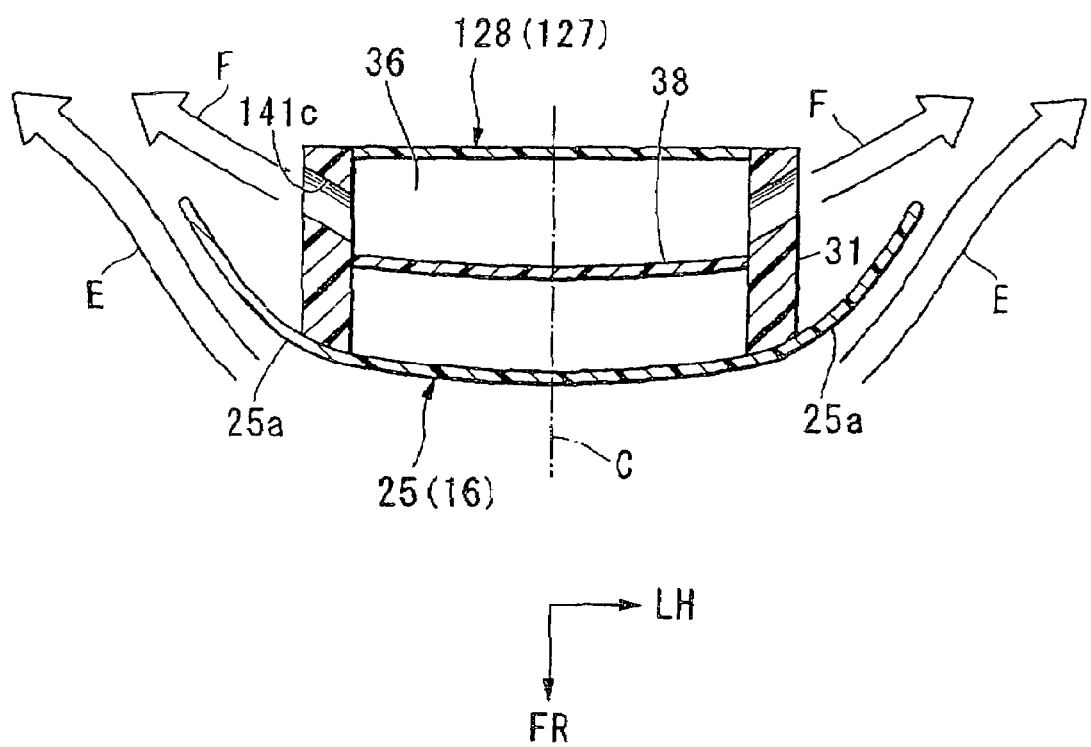
FIG. 9 is a cross-sectional view taken along a line G-G in FIG. 7 according to the second embodiment of the present invention.

Next, the second embodiment of the present invention is explained in conjunction with FIGS. 7 to 9 while also using FIGS. 1 to 3 auxiliary. In this embodiment, the constructions identical with the corresponding constructions of the first embodiment are given the same symbols and their explanation is omitted. FIGS. 7 and 8 show only a duct body 128 for facilitating the understanding of an essential part of a windshield device.

As shown in FIGS. 7 to 9, in the second embodiment of the present invention, side wall portions 131 of an air duct 127 are formed with a relatively large wall thickness, and air discharge ports 141a, 141b, 141c are directly formed in the side wall portions 131. More specifically, the air discharge ports 141a, 141b, 141c are configured such that through holes having an approximately elliptical shape are formed in the side wall portions 131 of the air duct 127 from an outer wall of the side wall portions 131, and the through holes are communicated with the inside of the air duct 127. Further, these air discharge ports 141a, 141b, 141c are formed to open obliquely in the rearward and upward directions of the vehicle body and, in the same manner as the first embodiment, the air discharge ports 141a, 141b, 141c are formed in three stages downwardly from above. Cross-sectional shapes of the air discharge ports 141a, 141b, 141c are gradually decreased in size from the upper stage to the lower stage.

Accordingly, the second embodiment also can obtain advantageous effects substantially equal to the advantageous effects of the first embodiment. Further, in the second embodiment, different from the above-mentioned first embodiment which forms the ducts 40a, 40b, 40c as parts separate from the air duct 127, the air discharge ports 141a, 141b, 141c are formed to be in communication with the inside of the air duct 127 from the outer wall of the side wall portions 131. Thus, it is possible to impart directivity to an air flow which flows in the inside of the air duct 127 whereby the air flow can be efficiently introduced into the air discharge ports 141a, 141b, 141c. Accordingly, as shown in FIG. 9, the air flow which flows in the inside of the air duct 127 can be efficiently blown off obliquely in the rearward and upward direction of the outside of the vehicle from the air discharge ports 141a, 141b, 141c as the air flow F. Thus, it is possible to suppress the intrusion of the air flow E which flows on the sides of the vehicle body between the screen unit 25 and the driver D in a cooperative manner with both side portions 25a of the screen unit 25 whereby a screen effect on the sides of the front cowling 16 can be enhanced.

Further, it is unnecessary to form the ducts 40a, 40b, 40c of the above-mentioned first embodiment as bodies separate from the air duct 127. Thus, the number of parts can be reduced and the structure can be simplified.

Figure 10:
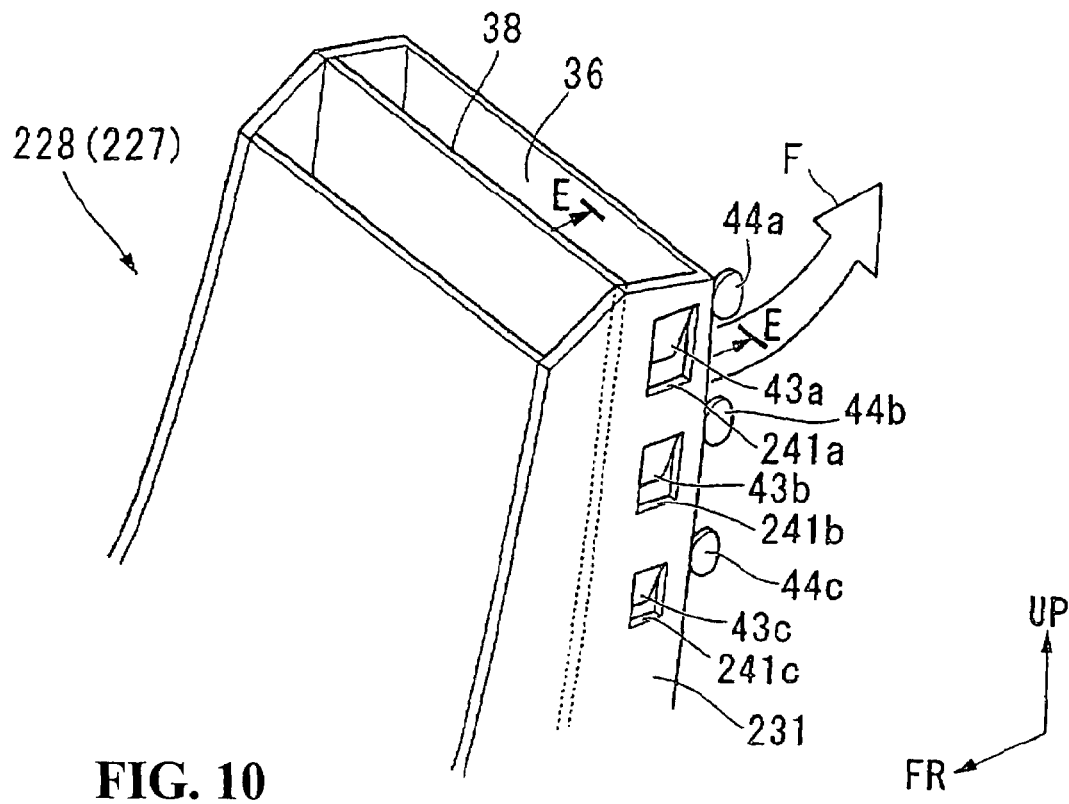
FIG. 10 is a perspective view of a portion a shown in FIG. 1 according to a third embodiment of the present invention.
Figure 11:
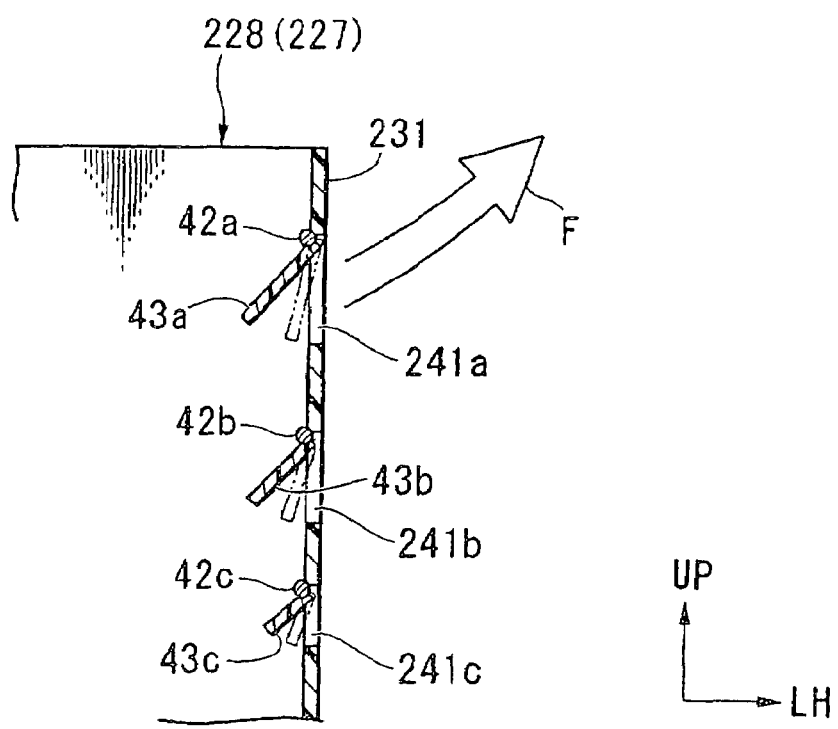
FIG. 11 is a cross-sectional view taken along a line E-E in FIG. 10 according to the third embodiment of the present invention.

Next, the third embodiment of the present invention is explained in conjunction with FIGS. 10 and 11 while also using FIGS. 1 to 3 auxiliary. Here, in this third embodiment, the constructions identical with the corresponding constructions of the first embodiment are given the same symbols and their explanation is omitted. Further, FIGS. 10 and 11 show only a duct body 228 for facilitating the understanding of an essential part of a windshield device.

As shown in FIGS. 10 and 11, in the third embodiment of the present invention, air discharge ports 241a, 241b, 241c having a rectangular cross-section are formed in side wall portions 231 of the air duct 227 in three stages. Louvers 43a, 43b, 43c are tiltably supported by way of hinge members 42a, 42b, 42c corresponding to the respective air discharge ports 241a, 241b, 241c. On vehicle-rear-side shaft ends of the louvers 43a, 43b, 43c, hook members 44a, 44b, 44c are mounted. By manipulating the respective hook members 44a, 44b, 44c, an occupant (rider D) can adjust the angles of the respective louvers 43a, 43b, 43c thus changing flow rates and air flow directions of air flows F blown off from the air discharge ports 241a, 241b, 241c. The cross-sectional shapes of the air discharge ports 241a, 241b, 241c provide decreased areas thereof from an upper stage to a lower stage.

All louvers 43a, 43b, 43c may be interlocked with each other using links and angles of all louvers 43a, 43b, 43c may be adjusted by the hook members mounted on a shaft end of one louver. Further, the louvers 43a, 43b, 43c may be tilted using an electric means.

Accordingly, the above-mentioned third embodiment also can obtain advantageous effects substantially equal to the advantageous effects of the first embodiment. Further, in the third embodiment, different from the above-mentioned first embodiment which forms the ducts 40a, 40b, 40c as parts separate from the air duct 227, it is possible to impart the directivity to the air flow which flows in the inside of the air duct 227 by the louvers 43a, 43b, 43c mounted by way of the hinge members 42a, 42b, 42c. Thus, the air flow can be efficiently introduced into the air discharge ports 241a, 241b, 241c. Accordingly, the air flow which flows in the inside of the air duct 227 can be efficiently blown off obliquely in the upward direction of the outside of the vehicle from the air discharge ports 241a, 241b, 241c as the air flow F. Thus, a screen effect on the sides of the front cowling 16 can be enhanced.

Further, by adjusting angles of the louvers 43a, 43b, 43c which are tiltably formed, it is possible to change flow rates and wind directions of the air flows F blown off from the air discharge ports 241a, 241b, 241c corresponding to liking of an occupant (rider D). Here, by adopting such a construction, different form the above-mentioned embodiments, the louvers 43a, 43b, 43c do not constitute the duct and are provided for merely changing the direction of the air flows. Thus, the necessity for taking the energy loss into consideration becomes small whereby the shapes of the air discharge ports 241a, 241b, 241c may be formed into a polygonal shape.

Figure 12A:
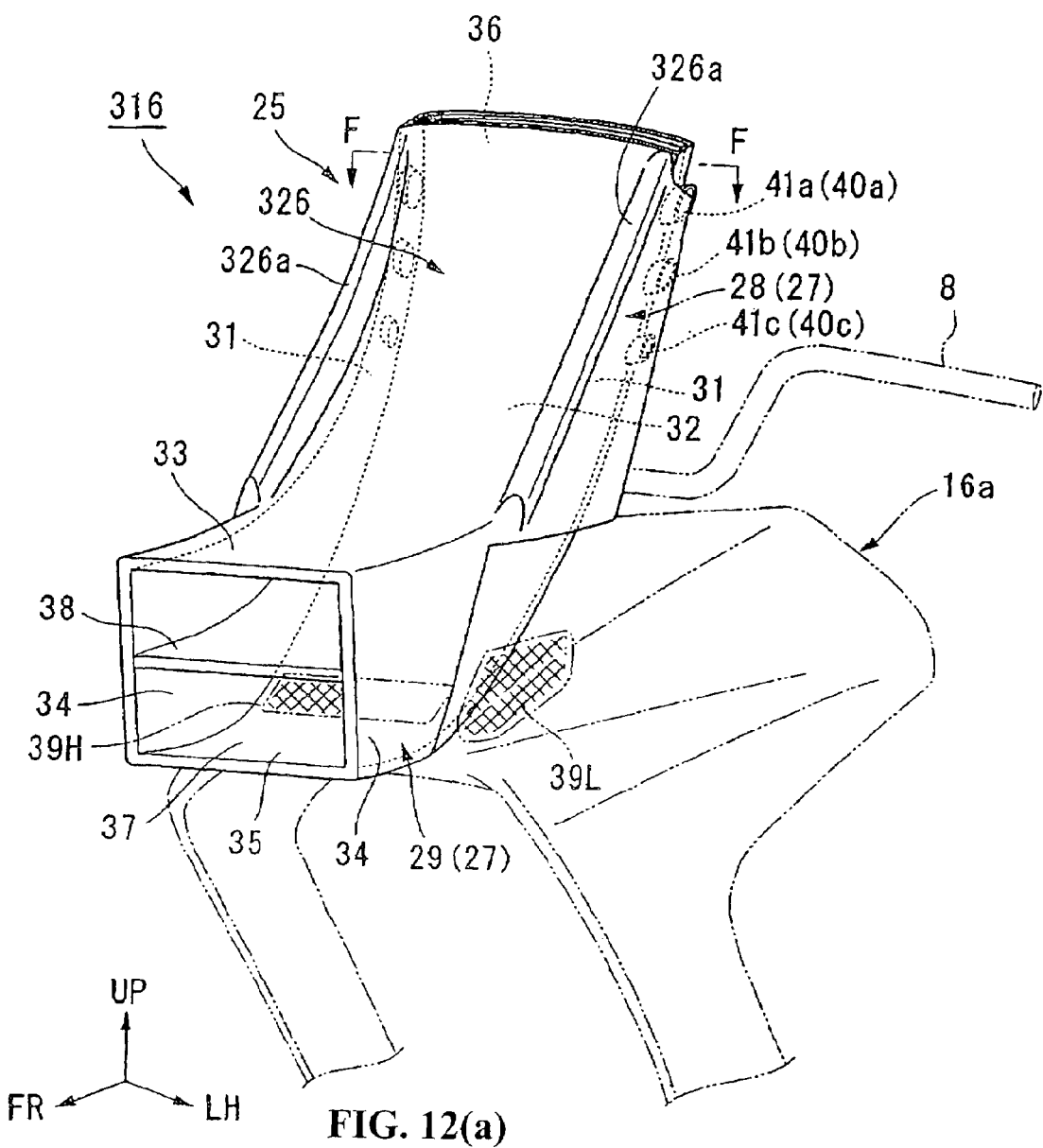
Figure 12B:
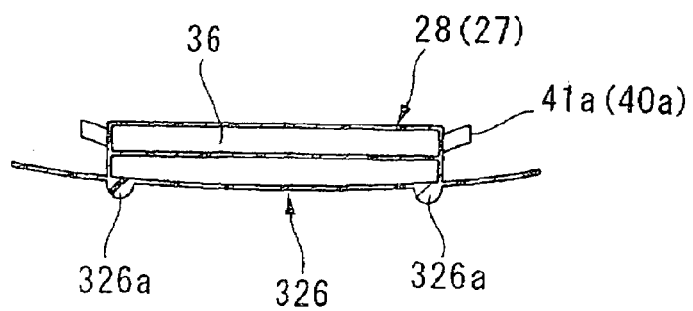

The present invention is not limited to the above-mentioned embodiments and, for example, as in the case of a front cowling 316 shown in FIG. 12, rail-like guide portions 326a which span upper and lower end portions of the screen 326 are formed on both side portions of a front portion of a screen 326. Due to a flow straightening effect of the guide portions 326a, the outside air which flows on a surface of the screen body 326 is favorably introduced thus further enhancing a screen effect due to the air flow.

Further, a cross-sectional area of an air flow passage R of the air duct 27 may be gradually decreased or increased toward the air blow-off opening 36 from the air introducing opening 37. In other words, an opening area of the air introducing opening 37 may be set larger or smaller than an opening area of the air blow-off opening 36. In this case, by blowing off the air flow which flows in the inside of the air duct 27 by increasing or decreasing a flow speed of the air flow, it is possible to obtain a screen effect which satisfies an object.

Further, corresponding to a cross-sectional area of the air flow passage R of the air duct 27 (opening areas of the air introducing opening 37 and the air blown-off opening 36), a plurality of partition walls 38 may be formed thus partitioning the air flow passage R in three stages or more.

Still further, a lamp arranged in the inside of the air introducing opening 37 may be formed of a head lamp having both of a high-beam radiating function and a low-beam radiating function, and a lamp which is arranged on both sides of the air introducing opening 37 may be also formed of a blinker.

Here, the cross-sectional shapes of the ducts 40a, 40b, 40c may be formed into a circular shape or the like other than an elliptical shape in place of a polygonal shape provided that an energy loss is not large. Further, air discharge ports may be formed on side wall portions of an upper-stage path of the air duct. Still further, the number of the air discharge ports may not be particularly limited.

Further, the constructions shown in the above-mentioned embodiments are exemplified as one example, and it is needless to say that the present invention is applicable to a two-wheeled vehicle other than the scooter-type vehicle, a three-wheeled vehicle or a four-wheeled vehicle, and various modifications are conceivable without departing from the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield device comprising:
    a windshield device body mounted on a front portion of a vehicle body and including a screen;
    an air introducing opening formed in a front portion of the windshield device body and opening forwardly;
    an air blow-off opening which is formed in an upper portion of the windshield device body and opens upwardly; and
    an air duct for allowing the air introducing opening and the air blow-off opening to communicate with each other;
    wherein a plurality of air discharge ports are formed in each side of the air duct, said discharge ports opening outwardly and to the sides of the vehicle body and directed obliquely, in the rearward direction.

2. The windshield device according to claim 1, wherein a duct which includes the air discharge port is mounted in the side of the air duct in the upper portion of the windshield device body.

3. The windshield device according to claim 1, wherein the air duct has a size thereof which is narrowed in a longitudinal direction of the vehicle body and a size thereof which is widened in a lateral direction of the vehicle body from the air introducing opening toward the air blow-off opening.

4. The windshield device according to claim 1, wherein a plurality of the air discharge ports are arranged along the vertical direction of the air duct.

5. The windshield device according to claim 1, wherein the duct is formed in an elliptical shape.

6. The windshield device according to claim 1, which further includes a screen extension portion extending continuously and frontwardly from a lower end portion of the screen, said screen extension having a curved shape with side wall extension portions extending from respective side wall portions and a rear wall extension portion extending therefrom for forming an inlet for said air introducing opening.

7. The windshield device of claim 6, wherein the screen extension cooperates with the discharge ports in channeling the air lateral of the vehicle.

8. The windshield device according to claim 1, wherein the air flow within said air introducing opening is blown off obliquely in a rearward and upward direction through the air blow-off opening.

9. The windshield device according to claim 1, wherein the air introducing opening is in the form of a trapezoidal shape wherein a width of a lower side is set larger than a width of an upper side as viewed in a front view.

10. The windshield device according to claim 9, wherein the air blow-off opening is formed in a rectangular shape wherein the air blow-off opening is larger than the air introducing opening in the width direction of the windshield device and is smaller than the air introducing opening in a thickness direction of the windshield device.

11. The windshield device of claim 1, wherein the air duct is provided with a partition wall which extends laterally across the air duct from the air introducing opening to the blow-off opening thereby dividing the air duct into fore and aft channels, said discharge ports being disposed in said aft channel.

12. The windshield device of claim 1 wherein the plurality of air discharge ports are disposed on each side of the air duct and the sizes of the cross-sectional shapes of said plurality of discharge ports gradually decrease in size from the upper discharge ports to the lower discharge ports.

13. The windshield device of claim 1, wherein adjusting means are operatively associated with the air discharge ports for adjusting the angles, air flow rates and air flow directions of the air flows through the air discharge ports.

14. The windshield device of claim 13, wherein the adjusting means are collectively or individually controlled by the occupant.

15. The windshield device of claim 1, wherein the walls of the air duct have sufficient thickness to define the air discharge port openings.

16. A windshield device comprising:
    a screen unit adapted to be mounted on a front portion of a vehicle body;
    an air introducing opening formed in a front portion of the screen unit and opening forwardly;
    an air blow-off opening which is formed in an upper portion of the screen unit and opens upwardly; and
    an air duct for allowing the air introducing opening and the air blow-off opening to communicate with each other;
    wherein a plurality of air discharge ports opening outwardly and to the sides from the screen unit is formed in each side of the air duct.

17. The windshield device according to claim 16, wherein a duct which includes the air discharge port is mounted in the side of the air duct in the upper portion of the windshield device body.

18. The windshield device according to claim 16, wherein the air duct has a size thereof which is narrowed in a longitudinal direction and a size thereof which is widened in a lateral direction from the air introducing opening toward the air blow-off opening.

19. The windshield device according to claim 16, wherein a plurality of the air discharge ports are arranged along the vertical direction of the air duct.

20. The windshield device according to claim 16, wherein the duct is formed in an elliptical shape.

21. The windshield device according to claim 16, and which further includes a screen extension portion extending continuously and frontwardly from a lower end portion of the screen unit, said screen extension having a curved shape with side wall extension portions extending from respective side wall portions and a rear wall extension portion extending therefrom for forming an inlet for said air introducing opening.

22. The windshield device according to claim 16, wherein the air flow within said air introducing opening is blown off obliquely in a rearward and upward direction through the air blow-off opening.

23. The windshield device according to claim 16, wherein the air introducing opening is in the form of a trapezoidal shape wherein a width of a lower side is set larger than a width of an upper side as viewed in a front view.

24. The windshield device according to claim 23, wherein the air blow-off opening is formed in a rectangular shape wherein the air blow-off opening is larger than the air introducing opening in the width direction of the screen unit and is smaller than the air introducing opening in a thickness direction of the screen unit.

* * * * *